Aug. 27, 1963  F. J. LIPMAN  3,101,696
POULTRY BREAST COVER DEVICE
Filed March 16, 1961
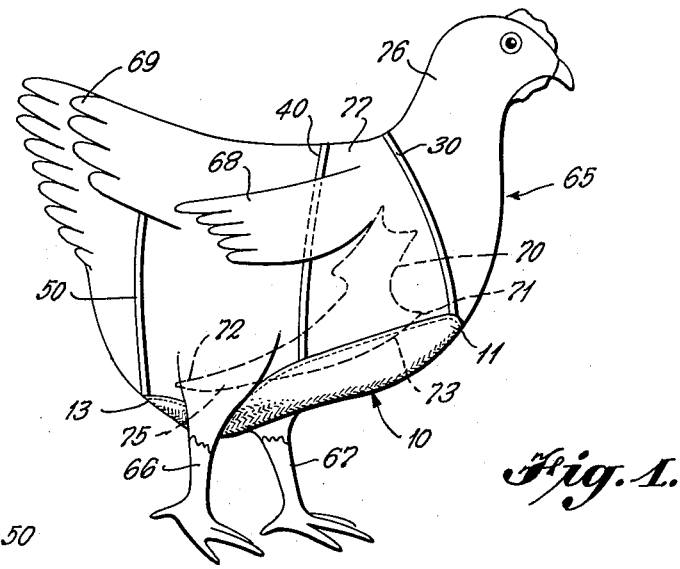
INVENTOR
Frank J. Lipman
By Shoemaker and Mattare
ATTORNEYS United States Patent Office 3,101,696
Patented Aug. 27, 1963

3,101,696
POULTRY BREAST COVER DEVICE
Frank J. Lipman, Augusta, Maine, assignor to Samuel Lipman Sons, Augusta, Maine, a corporation of Maine
Filed Mar. 16, 1961, Ser. No. 96,152
5 Claims. (Cl. 119—143)

The present invention relates to a new and novel poultry breast cover device, and is more particularly directed toward a breast cover device for use with chickens to eliminate the formation of blisters on the breast portion of the chickens.

While the present invention is suitable for use with various forms of poultry such as chickens, turkeys and the like, a particular problem exists in the problem of raising roasting chickens and capons.

The problem is particularly acute in connection with the above type chickens, but it is evident that the invention may be extended for use with laying hens as well since many of these are eventually sold for use in some sort of food product.

Blisters are formed on the breast area of the chickens due to an irritation of this area caused by the birds' lying down on typical poultry litter such as sawdust, corn cobs, straw and the like.

Poor feathering of the birds may also be a factor in causing the creation of blisters. These blisters generally form on the skin of the chicken directly over the sternum or keel bone of the chicken and to either side thereof. This occurs since the anatomy of a chicken is such that when in a lying-down position, a portion of the sternum projects sharply outwardly and causes the overlying skin portion to be more vulnerable to damage.

This problem of blister formation on the breast area of chickens has been a long-standing one in the art, and up until this time no measures have proved successful in preventing such blistering.

The blistering is very undesirable since it results in an economic loss to the poultry farmer. The loss may in fact be quite considerable since a flock of male roasters or capons may often run from 10 to 80 percent blistered along the sternum and the flocks at some times are 100 percent blistered.

When the chickens are processed for marketing, a Federal inspector determines the wholesomeness of the meat and if blisters are present, they are required to be trimmed. Any bird which has cuts or tears on the breasts or legs thereof has a reduced grade, and accordingly, the trimming required in the case of blisters does reduce the grade of the carcass. It will be understood that the blisters are filled with an exudate which may comprise pus, lymph, blood and other body fluids, and accordingly, it is necessary to remove such blisters prior to processing.

These blisters form over the pectoralis major muscles of the breast, and it is evident that the problem is quite serious since the breast meat is the most expensive meat on poultry, and further comprises 35 percent of the total meat of the bird.

It is accordingly clear that the elimination of such blisters is highly advantageous since it increases the yield of the meat and further provides a higher quality carcass which will bring a better market price.

The price received for a so-called "A-quality carcass" is substantially greater than that received for a so-called "B-quality carcass" and accordingly, the economic savings are quite significant.

As presently defined by the Poultry Grading Manual of the United States Department of Agriculture, an A-quality carcass is one which is free from cuts and tears on the breasts and legs, while a B-quality carcass may have cuts and tears on the breasts and legs, the aggregate length of which does not exceed 1½ inches. If the aggregate length is greater than 1½ inches, the carcass then becomes a C-quality carcass.

The problem of blistering is generally greater with male fowls since males are recognized as having a higher incidence of breast blistering which is due to the heavier weight thereof and other possible inherited factors.

The present invention provides a covering which fits over and provides continuous protection for the breast area of the chicken. The covering may be placed on the bird at any age wherein it is found necessary to protect the breast area in order to prevent the formation of blisters. Normally, the covering will be applied to roasting chickens and capons at an age of approximately six to ten weeks, depending on the weight, general physical condition, and other hereditary characteristics. The covering is then retained in place during the remaining period of growth of the chicken, and the covering is not removed until the chickens are finally processed, whereupon the coverings may be removed and used again on different chickens.

The covering provides protection against irritation to the breast area normally caused by the litter, and it has been found in practice to substantially eliminate the formation of blisters on the breast area of chickens thereby eliminating any under grades in a flock.

In addition, the covering also has the advantageous effect of protecting against breakage of feathers which can cause roughness, and further prevents calluses. A still further advantage of the covering is that it assists in preventing bruising of the breast meat which sometimes occurs due to rough handling when the coops are being loaded and unloaded for example. By providing a resilient covering for the breast area, the device may also assist in reducing the incidence of crooked and dented breasts which may occur due to impact of the breast area on hard surfaces and the like.

The device of the present invention includes a covering or body of material which is adapted to fit about the body of the fowl. Preferably, this material is flexible so as to readily conform to the shape of the fowl, and furthermore, the material is preferably porous in nature so as to permit relatively free circulation of air therethrough so as to make the covering more comfortable for the fowl and to prevent undue irritation of the material of the covering to the body of the fowl.

The covering is of a particular configuration so as to readily conform to the body of a chicken, and resilient band means is provided for retaining the covering in operative position. Three bands fit over upper portions of the chicken so as to interfere with free movement of the chicken, and when in operative position, the entire device is in a relatively hidden position to the chicken itself so that the chicken will not be unduly distracted or annoyed by the presence of the device. As mentioned previously, the sternum or keel bone is the principal cause of blistering and it is the skin in overlying relationship to the sternum which must be protected. Accordingly, the device is so constructed that it will completely cover the area of the breast of the chicken adjacent to the sternum which is commonly blistered.

The resilient band means of the invention serves a dual function. In the first place, it of course serves to hold the covering in place and to cause it to more or less conform to the body configuration of the chicken. Secondly, these resilient bands permit the device to be effectively mounted in position on different size chickens, and also the resiliency of the bands accommodates the growth of the chickens whereby as the chicken gets larger, the bands will stretch and retain the covering in the proper position so as to continuously protect the breast area.

An object of the present invention is to provide a new and novel poultry breast cover device which is adapted to continuously protect the breast area of poultry so as to prevent the formation of blisters, calluses and the like on the breast portion of poultry.

Another object of the invention is the provision of a poultry breast cover device which does not distract, irritate or annoy a fowl upon which it is placed and which further permits freedom of movement of the particular bird.

A further object of the invention is to provide a poultry breast cover device which is adapted to be mounted on different size chickens and further which permits growth of the chickens while the device is mounted in operative position.

A still further object of the invention is to provide a poultry breast cover device which is very simple and inexpensive in construction, and yet which is effective and reliable in use.

Other objects and many attendant advantages of the invention will become more apparent when considered in connection with the specification and accompanying drawing, wherein:

FIG. 1 illustrates a chicken with the device of the present invention mounted in operative position on the chicken;

FIG. 2 is an enlarged plan view of the device of the present invention;

FIG. 3 is an enlarged sectional view taken along line 3—3 of FIG. 2 looking in the direction of the arrows; and FIG. 4 is an enlarged detail view illustrating the manner of attaching one of the resilient bands to the rear portion of the covering.

Referring now to the drawings wherein like reference characters designate corresponding parts throughout the several views, the device includes a covering or body portion 10 which is preferably formed of a porous flexible fabric material such as woven cotton cloth or the like. It is apparent that the material of the covering itself can be varied widely, and other suitable material such as plastic and the like may be employed if desired. It is, however, considered preferable to provide a porous material which will permit air circulation therethrough in order to provide maximum comfort and well being for the associated fowl.

Additionally, it is preferable that the material be sufficiently flexible so as to readily conform to the outer configuration of the chicken.

As seen particularly in FIG. 2, the covering 10 includes a front portion 11, an intermediate portion indicated generally by arrow 12, and a rear portion 13, the front portion being associated with the forward portion of a fowl's body while the rear portion is associated with a rear under portion of a fowl's body.

It will be noted that the forwardmost edge 15 of the covering or body 10 is relatively straight, and intersects a pair of side edges 16 and 17 to form corners 18 and 19.

The side edges 16 and 17 diverge rearwardly from the forward edge 15 toward the intermediate portion 12 of the covering. The side edges 16 and 17 diverge to points 19 and 20 defining therebetween the portion of greatest width of the covering.

The side edges 16 and 17 converge rearwardly and inwardly from the widest part of the intermediate portion to the rear end portion 13 whereat the two side edges are joined by an arcuate portion 22.

The side edge portions 16 and 17 of the body 10 are provided with overcast stitching indicated by reference numerals 25 to prevent any raveling along the side edges of the covering.

A first flexible band 30 has the opposite end portions 31 and 32 connected to the covering 10 adjacent the corners 18 and 19 respectively. The end portions of the band are preferably permanently affixed to the covering by means of stitching indicated by reference numerals 33 and 34. The band itself is of a resilient flexible construction such that it can be readily stretched. For example, the band may contain slender threads of rubber or similar elastic material which may be surrounded by nylon or other fibers which will not irritate the body of the fowl.

A second resilient band 40 has the opposite end portions 41 and 42 fixedly attached to the covering by means of stitching indicated by reference numerals 43 and 44. The resilient band 40 is of a similar construction to resilient band 30 and it will be noted that the ends of band 40 are connected to the intermediate portion of the covering at approximately the points 19 and 20 of maximum width of the covering which also may be noted to lie approximately medially of the length of the over-all covering as seen in FIG. 2.

A third resilient band 50 of the same construction as bands 30 and 40 has the opposite end portions 51 and 52 thereof fixedly attached to the rear portion of the covering.

Referring to FIG. 4, the manner of attachment of the end portion of band 50 is more clearly illustrated. In this figure, it will be seen that three lines of stitching 55, 56 and 57 are employed for securely attaching the end portions of band 50 to the rear portion of the covering. While a specific mode of stitching has been illustrated, it is apparent that the manner of attachment of the bands may be readily varied as desired as long as the bands are securely attached to the body of the covering at the points indicated.

Referring now to FIG. 1, a chicken is indicated generally by reference numeral 65, the two legs of the chicken being indicated by reference numerals 66 and 67, one wing being indicated by reference numeral 68 and the tail portion is indicated generally by reference numeral 69.

The position of the sternum or keel bone is indicated by the dotted line 70, the anterior portion of the sternum being indicated by reference numeral 71, and the posterior portion of the sternum being indicated by reference numeral 72. As discussed previously, it is a particular object of the invention to protect the breast area of the chicken adjacent to the lowermost portion of the sternum as seen in FIG. 1, including the sternal crest portion indicated by reference numeral 73 and the meta sternum portion indicated by reference numeral 75.

The covering 10 is shown in operative position on the chicken, and it will be noted that the forward resilient band 30 extends about the neck portion indicated by reference numeral 76, while the resilient band 40 extends over the top or back portion of the chicken and around the central portion of the chicken's body, and further lying beneath the wings of the chicken so as not to interfere with the motion of the wings.

The rearmost resilient band 50 extends up over the tail or coccygeal area of the chicken, the uppermost portion of this band being hidden by the tail feathers.

In order to provide a more or less universal fit for different size chickens, the band 30 has the smallest length of the three bands while the band 50 has the greatest length of the three bands. In a typical arrangement, the band 50 may be two or more times the length of band 30. On the other hand, the intermediate band 40 may be approximately 1½ times the length of the smallest band 30. While these relative lengths may be varied as desired, these relationships are typical in fitting the device properly upon a typical roasting chicken or capon.

It will be noted that when the device is mounted in the operative position seen in FIG. 1, the covering or body portion 10 will completely protect the breast area of the chicken, the forward portion 11 of the covering extending forwardly of the anterior portion of the sternum while the rear portion 13 of the covering extends rearwardly of the posterior portion of the sternum.

Accordingly, when the chicken is lying down, the breast area adjacent to the sternum will be completely and continuously protected.

It will be evident that the device is to a great extent hidden from the chickens' view and consequently will not produce any excessive distraction or annoyance to the chicken. Furthermore, the device is held in a fixed position relative to the chicken so as to reduce any irritation to the chicken, and at the same time freedom of movement is permitted. It will be noted that the wings of the chicken may be flapped as desired, and that the intermediate portion of the covering defined by the converging edges toward the rear portion of the covering extends between the legs of a chicken whereby the legs can be moved in the normal accustomed manner.

The resilient bands 30, 40 and 50 readily adapt the device for use with different size chickens. Furthermore, the device may be mounted in operative position on a chicken when the chicken is fairly small, and as the chicken grows, the resilient bands will stretch and at the same time maintain the covering in the desired position over the breast area at all times. It is apparent that the device of the present invention is quite simple and inexpensive in construction, and yet at the same time is very effective in preventing blistering and the like and is further very reliable in use since the relationship of the covering and the resilient bands to the chicken's anatomy is such that the device can not be accidentally displaced or removed from the chicken.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A breast cover device for chickens comprising a covering formed of flexible material and being adapted to fit over the breast area of the chicken and underlying the entire sternum area of the chicken, said covering including a front end portion disposed across the front portion of the chicken, an intermediate portion disposed beneath an under portion of the chicken and extending between the legs of the chicken, and a rear portion disposed beneath an under portion of the chicken rearwardly of the legs of the chicken, a first securing member connected with said front portion of the covering and extending about the neck portion of the chicken, a second securing member connected with an intermediate portion of the covering and extending over a top portion of the chicken, and a third securing member connected with said rear portion of the covering and extending about the tail portion of the chicken, whereby the covering is retained in underlying relation to the breast area of the chicken to provide continuous protection for said breast area each of said securing members comprising a band of elastic material such that the device may be secured to different size chickens and further such that the device accommodates growth of a chicken upon which it is mounted.

2. A device as defined in claim 1, wherein the edges of said covering diverge rearwardly of the covering between said front portion and said intermediate portion and converge rearwardly between said intermediate portion and said rear portion.

3. A breast cover for chickens comprising a covering formed of flexible material and having a front portion, an intermediate portion and a rear portion, said covering being adapted to fit over the breast area of the chicken and underlying the entire sternum area of the chicken, the front portion of the covering extending across the front portion of the chicken ahead of the interior portion of the sternum of the chicken, the intermediate portion of the covering fitting beneath the under surface of the chicken and extending between the legs of the chicken, the rear portion of the covering fitting beneath an under portion of the chicken rearwardly of the posterior portion of the sternum of the chicken, said covering tapering outwardly rearwardly from said front portion to said intermediate portion, the intermediate portion tapering inwardly and rearwardly to said rear portion, a first elastic band secured to said front portion and fitting about the neck portion of the chicken, a second elastic band connected to said intermediate portion and extending over the back portion of the chicken, and a third elastic band connected with said rear portion and extending over the tail portion of the chicken, said second band being connected to said covering forwardly of the legs of the chicken, and said third band being connected to said covering rearwardly of the legs of the chicken.

4. A poultry breast cover device comprising a body of flexible porous fabric material having a front portion, an intermediate portion and a rear portion, the edges of said body diverging from said front portion toward said intermediate portion and said edges also diverging from said rear portion toward said intermediate portion, a first elastic band having the opposite ends thereof connected to spaced portions of said front portion adjacent to the edges of the body, a second elastic band having the opposite ends thereof connected to said intermediate portion adjacent the edges of the body, and a third elastic band having the opposite end portions thereof connected to said rear portion adjacent the edges of the body.

5. A device as defined in claim 4, wherein said first band is of less length than said second and third bands and is adapted to fit about the neck portion of a fowl, said third band being of greater length than the first and second bands and being adapted to fit about the tail portion of a fowl, said second band being connected to said body at approximately the medial portion thereof and being adapted to fit about the body of a fowl.

References Cited in the file of this patent

UNITED STATES PATENTS

| 1,987,818 | Cook | Jan. 15, 1935 |
| 2,006,118 | Smith | June 25, 1935 |
| 2,882,858 | Dlugi | Apr. 21, 1959 |

FOREIGN PATENTS

| 7,869 | Great Britain | Oct. 29, 1914 |